(No Model.)

C. L. D'IVERNOIS.
FISH HOOK.

No. 497,962. Patented May 23, 1893.

WITNESSES:
Marion Hall
H. Obermayer

INVENTOR
C. L. d'Ivernois
BY Guipel & Raegener
ATTORNEYS.

UNITED STATES PATENT OFFICE.

CHARLES L. D'IVERNOIS, OF BROOKLYN, NEW YORK.

FISH-HOOK.

SPECIFICATION forming part of Letters Patent No. 497,962, dated May 23, 1893.

Application filed February 10, 1893. Serial No. 461,752. (No model.)

*To all whom it may concern:*

Be it known that I, CHARLES L. D'IVERNOIS, a citizen of the United States, residing at Brooklyn, in the county of Kings and State of New York, have invented certain new and useful Improvements in Fish-Hooks, of which the following is a specification.

This invention relates to an improved fish-hook of that class which is used for deep sea fishing and which is combined with a sinker in such a manner that the hook when resting on the ground is always held so as to extend in upward direction ready for the bite; and the invention consists of a fish-hook provided with an eye or loop in its shank and a conically-tapering sinker below the joint, said sinker serving to hold the hook in upwardly-inclined position, as will be fully described hereinafter and finally pointed out in the claim.

Figure 1:
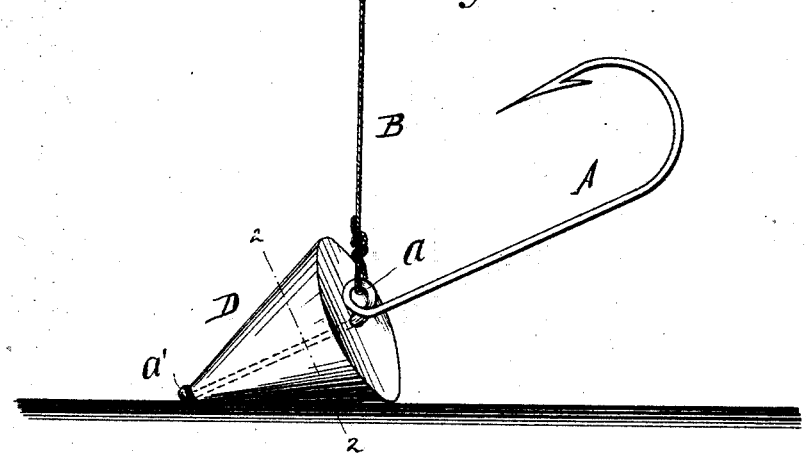
Figure 2:
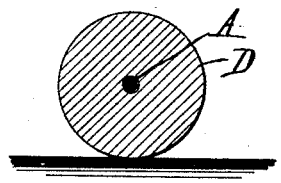

In the accompanying drawings, Figure 1 represents a side elevation of my improved fish-hook, and Fig. 2 is a vertical transverse section, on line 2 2, Fig. 1.

Similar letters of reference indicate corresponding parts.

Referring to the drawings, A represents a fish-hook which is specially intended for deep sea-fishing. The shank of the hook A is provided with an eye or loop $a$, to which the fish-line B is applied. To the end of the shank beyond the loop or eye $a$ is applied a conically-tapering sinker D, which is retained on the shank of the hook A by means of an enlarged end $a'$, the sinker being provided with a central opening or bore for the end of the shank of the fish-hook A.

When the hook with its sinker and the bait is lowered, the hook arrives on the bottom of the water and the strain on the hook will hold the same on a vertical plane, while the conically-tapering sinker will hold the end of the shank on the bottom, while the shank itself assumes an upwardly-inclined position, as shown clearly in Fig. 1. In this position the bait is more temptingly exposed to the fish and prevented from resting on the bottom where the fish can nibble on the same without taking the hook with the bait.

Having thus described my invention, I claim as new and desire to secure by Letters Patent—

A fish-hook, the shank of which is provided with an eye or loop for attaching the fish-line, and a conically-tapering sinker retained on the end of the shank beyond the eye or loop, the larger end of said sinker being adjacent to the eye or loop, substantially as set forth.

In testimony that I claim the foregoing as my invention I have signed my name in presence of two subscribing witnesses.

CHAS. L. D'IVERNOIS.

Witnesses:
PAUL GOEPEL,
H. WILLARD GRIFFITHS.